United States Patent
Bae et al.

(10) Patent No.: US 7,171,079 B2
(45) Date of Patent: Jan. 30, 2007

(54) TUNABLE DISPERSION COMPENSATOR FOR AN OPTICAL TRANSMISSION SYSTEM

(75) Inventors: Jun-Kye Bae, Seongnam-si (KR); Jun-Hee Kim, Seoul (KR); Young-Geun Han, Seoul (KR); Sang-Hyuck Kim, Seoul (KR); Sang-Bae Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 164 days.

(21) Appl. No.: 10/936,109

(22) Filed: Sep. 8, 2004

(65) Prior Publication Data
US 2005/0084209 A1   Apr. 21, 2005

(30) Foreign Application Priority Data
Sep. 8, 2003   (KR)   .................. 10-2003-0062517

(51) Int. Cl.
*G02B 6/34* (2006.01)
(52) U.S. Cl. .......................................... 385/37
(58) Field of Classification Search .............. None
See application file for complete search history.

(56) References Cited

U.S. PATENT DOCUMENTS

| | | | |
|---|---|---|---|
| 6,360,042 B1 * | 3/2002 | Long | 385/37 |
| 6,366,721 B1 * | 4/2002 | Hu et al. | 385/37 |
| 6,788,851 B1 * | 9/2004 | Bylander et al. | 385/37 |
| 2002/0131709 A1 * | 9/2002 | Miller et al. | 385/37 |
| 2003/0012499 A1 * | 1/2003 | Mendez et al. | 385/37 |
| 2003/0072532 A1 * | 4/2003 | Giannone et al. | 385/37 |

OTHER PUBLICATIONS

S. Chung et al. Group delay control of super-imposed fiber gratings using a two-column system mounted on a rotatable disk. IEEE Photonics Technology Letters, vol. 16 No. 1, pp. 153-155, Jan. 2004.*

J. Kwon et al. Group-delay-tailored chirped fiber Bragg gratings using a tapered elastic plate. IEEE Photonics Technology Letters, vol. 14 No. 10, pp. 1433-1435, Oct. 2002.*

Y. Han et al. Tunable dispersion compensator based on uniform fiber Bragg grating and its application to tunable pulse repetition-rate multiplication. Optics Express, vol. 13 No. 23, pp. 9224-9229, Nov. 2005.*

* cited by examiner

*Primary Examiner*—Rodney Bovernick
*Assistant Examiner*—Mike Stahl
(74) *Attorney, Agent, or Firm*—Jones Day

(57) ABSTRACT

Provided is a tunable dispersion compensator based on an optical fiber grating for use in an optical transmission system. A tunable dispersion compensator comprises: a disk; a ring surrounding the disk, wherein the ring is rotatable independent of the disk; and a bendable plate crossing the disk and having end parts configured to move with the rotation of the ring, wherein at least one of the optical fiber grating is attached to the plate.

9 Claims, 4 Drawing Sheets

TUNABLE DISPERSION COMPENSATOR FOR AN OPTICAL TRANSMISSION SYSTEM

FIELD OF THE INVENTION

The present invention generally relates to a dispersion compensation for use in an optical transmission system, and more particularly, to a tunable dispersion compensator based on optical fiber grating.

BACKGROUND OF THE INVENTION

Optical transmission technologies have been rapidly improving due to the development of optical fiber technologies and light sources such as semiconductor lasers. In particular, wavelength division multiplexing, in which optical signals having different wavelengths are transmitted through a single mode fiber, has been established as the key technology to optical communications. Further, the problem of energy loss in optical signals, which is caused by long distance transmission, has been resolved by the recent development of an Erbium-doped fiber amplifier ("EDFA").

The wavelength band of 1,530–1,565 nm is most commonly employed in optical transmission technologies. In the case that optical signals in the wavelength band are multiplexed and transmitted through a single optical fiber, each of the optical signals has a different refraction index with respect to each wavelength. The different refractive indices to the optical fiber depending on the wavelength causes the phenomenon of dispersion, in which the optical signals through a single optical fiber over a long distance become spread along the time axis. As the required transmission distance becomes longer, the dispersion effect becomes even more prominent to the degree that the transmitted optical signals overlap each other. Thus, it is difficult to discriminate the optical signals at the receiving end of the optical transmission system.

To compensate for the dispersion of these optical signals, there has been mainly used a tunable dispersion compensator adopting a optical fiber grating. Such dispersion compensator facilitates a connection to an optical cable, provides a low transmission loss, and offers no nonlinear phenomenon of the optical signals. For instance, if a central wavelength of the optical signals is $\lambda_1$, the optical signals consist of a plurality of wavelengths that exist within the range from $\lambda_1-\delta$ nm to $\lambda_1+\delta$ nm. In such a case, it is known that the longest wavelength, $\lambda_1+\delta$ nm, of the optical signals causes the most severe dispersion along the time axis. This is due to a more slow transmission rate than other wavelengths when its transmission distance becomes longer. On the other hand, the smallest wavelength, $\lambda_1-\delta$ nm, of the optical signals causes the lowest dispersion due to a more rapid transmission rate than other wavelengths although its transmission distance becomes longer. Consequently, in order to compensate for the dispersion of the longest wavelength, $\lambda_1+\delta$ nm, of the optical signal pulses, it may be desirable to reduce a reflection path in the inner of the optical fiber grating. However, in order to compensate the dispersion of the shortest wavelength, $\lambda_1-\delta$ nm, it may be preferable to extend a reflection path within the optical fiber grating, thereby compensating the dispersion of the optical signal pulses caused by long distance transmission.

Methods for controlling dispersion value with the tunable dispersion compensator based on the optical fiber grating may be classified into two methods. According to the first method, (1) the optical fiber grating are divided into several or dozens of parts, (2) the refractive index of the grating is changed by heating and cooling each part at a different temperature in order to adjust the dispersion value. According to the second method, (1) optical fiber grating is attached to a surface of a plate, (2) the plate is bent change the period of the grating, and (3) the dispersion value is adjusted due to the changed period of the grating.

However, in the first method, the variation of refractive indices of the grating parts becomes discontinuous due to the repeated heating and cooling, and there may occur unexpected variations of refractive indices on adjacent parts due to thermal conductions. Thus, the performance of the tunable dispersion compensator is degraded.

In the second method, a bending process is performed. More specifically, one of ends of the metal plate, to which the optical fiber grating is attached, becomes fixed and so that only the other end of the metal plate is moved. Therefore, the period of the optical fiber grating may be varied due to a tensile force and a contractile force induced by the bending. In other words, the period of the optical fiber grating becomes longer when the tensile force is induced, while the period of the optical fiber grating becomes shorter when the contractile force is induced. As such, by varying the period of the optical fiber grating, the dispersion value, which is defined as a variation of group delay time of wavelengths of the optical signals, can be adjusted. However, the second method has shortcomings in that it cannot provide a linear dispersion slope and limits the control range of the dispersion value. This is because only one end of the metal plate is moved in the conventional compensator in order to vary the period of the optical fiber grating.

SUMMARY OF THE INVENTION

It is, therefore, an object of the present invention to provide a tunable dispersion compensator capable of making a linear dispersion value of an optical fiber grating and expanding the control range of the dispersion value in a simple and uncomplicated manner.

In accordance with an embodiment of the present invention, there is provided a tunable dispersion compensator comprising: a disk; a ring surrounding the disk, wherein the ring is rotatable independent of the disk; and a bendable plate crossing the disk and having end parts configured to move with the rotation of the ring, wherein at least one of the optical fiber grating is attached to the plate.

In accordance with another embodiment of the present invention, there is provided a tunable dispersion compensator comprising: a disk; a ring surrounding the disk, wherein the ring is rotatable independent of the disk; a bendable metal plate crossing the disk and having end parts configured to move with the rotation of the ring, wherein at least one of the optical fiber grating is attached to the metal plate; and a first holder and a second holder for fixing the metal pate to the ring.

In accordance with still another embodiment of the present invention, there is provided a tunable dispersion compensator comprising: a first pate; a second plate adjacent to the first plate, wherein the second plate is moveable independent of the first plate; and a bendable first third plate crossing the first plate and having end parts configured to move with the movement of the second plate, wherein at least one of the optical fiber grating is attached to the third plate.

BRIEF DESCRIPTION OF DRAWINGS

The above object and features of the present invention will become more apparent from the following description of the preferred embodiments given in conjunction with the accompanying drawings.

DETAILED DESCRIPTION OF THE PRESENT INVENTION

The preferred embodiments of the present invention will be described in detail with reference to FIGS. 1 and 4.

Figure 1:
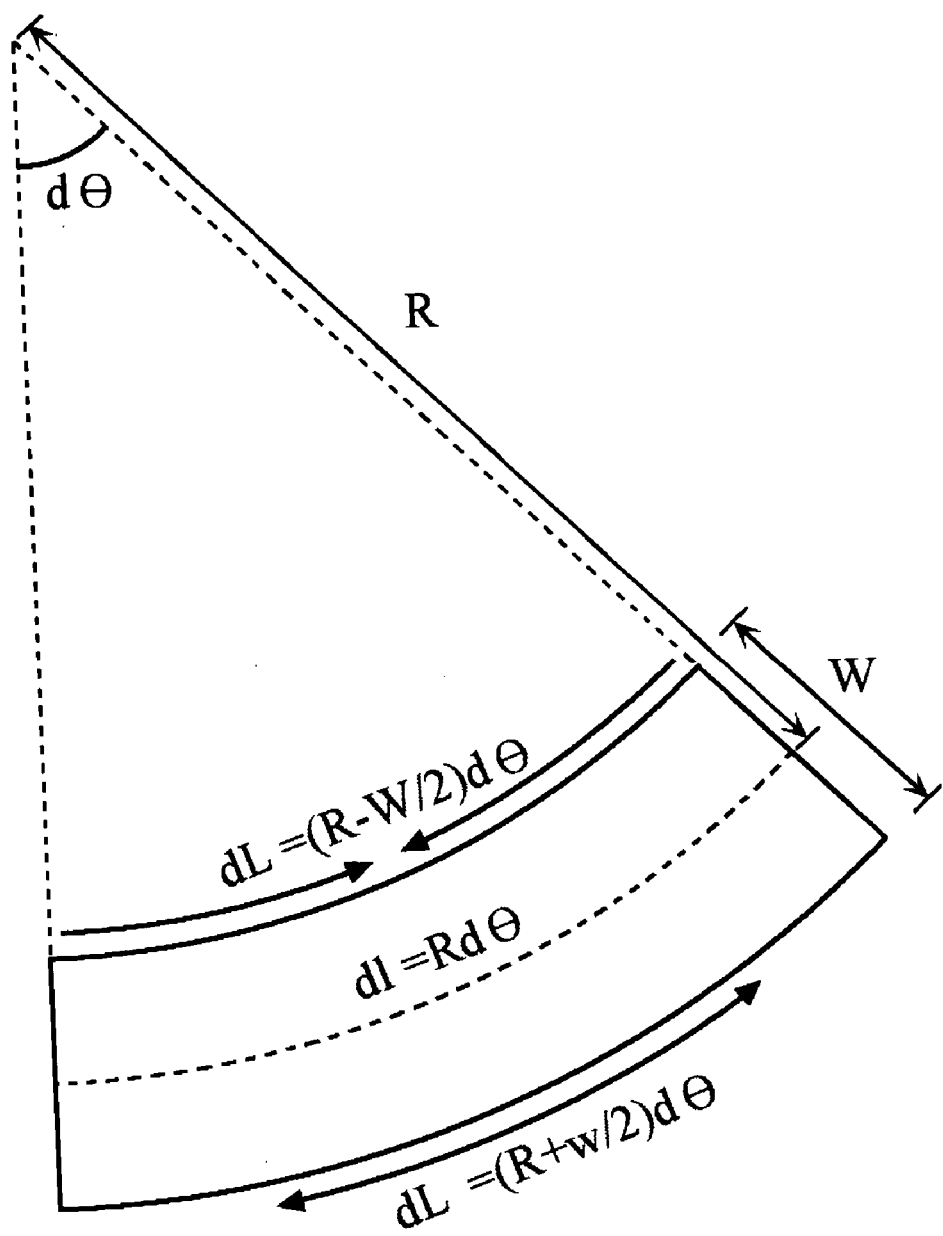
FIG. 1 shows a diagram illustrating a tensile force and a contractile force induced by bending.

Referring more particularly to FIG. 1, there is provided an illustration that explains a tensile force and a contractile force induced by bending. The metal plate becomes bent, after an optical fiber grating (not shown) is attached to a surface of the metal plate. For explanation, assuming that the curvature of bent metal plate is R, then the magnitude of tensile force $dL_T$ and contractile force $dL_C$ induced on the bent metal plate may be calculated from following equation Eq.(1).

$$\varepsilon = \frac{1}{R} \cdot \frac{\omega}{2} = \frac{d\theta}{dl} \cdot \frac{\omega}{2} \qquad \text{Eq. (1)}$$

In equation 1, w, dθ and dl denote a depth of the metal plate, a variation quantity of angle and variation quantity of the metal plate, respectively. According to equation 1, contractile force($dL_C=(R-w/2)d\theta$) and tensile force($dL_T=(R+w/2)d\theta$) are induced on the inner and outer surfaces of the metal plate, respectively.

Meanwhile, when the metal plate is bent as shown in FIG. 1, the period of the optical fiber grating attached to the metal plate increases or decreases at a constant rate. The tensile force and the contractile force may be represented as a function of a length L of the metal plate and chirping rate Δch of the optical fiber grating that varies with the bending of the metal plate, as shown by the following equation Eq.(2).

$$\epsilon(L) = \Delta ch \cdot L \qquad \text{Eq.(2)}$$

From Eqs.(1) and (2), an angle θ, which denotes how much the both ends of the metal plate are moved by the bending, can be derived as following equation Eq.(3).

$$\theta = \frac{\Delta ch \cdot L^2}{w} \qquad \text{Eq. (3)}$$

To represent the curvature of the bent metal plate with an orthogonal coordinate, the following equation Eq.(4) may be used.

$$dx = R\left[\sin\left(\theta + \frac{d\theta}{2}\right) - \sin\left(\theta - \frac{d\theta}{2}\right)\right] \cong dL\cos\theta \qquad \text{Eq. (4)}$$

$$dy \cong dL\sin\theta.$$

Also, from Eq.(4), x and y may be obtained as following equation Eq.(5).

$$x = \sqrt{\frac{w}{\Delta ch}} \cdot C\left(\sqrt{\frac{\Delta ch}{w}} L\right) \qquad \text{Eq. (5)}$$

$$y = \sqrt{\frac{w}{\Delta ch}} \cdot S\left(\sqrt{\frac{\Delta ch}{w}} L\right)$$

C(x) and S(x) are Fresnel functions which may be defined as follows:

$$C(x) = \int_0^x \cos(t^2)\,dt, \qquad \text{Eq. (6)}$$

$$S(x) = \int_0^x \sin(t^2)\,dt.$$

From Eqs.(5) and (6), it can be confirmed that the bending curve formed by the linear tensile force and contractile force has the shape which is that of the curve obtained from Fresnel function.

Figure 2:
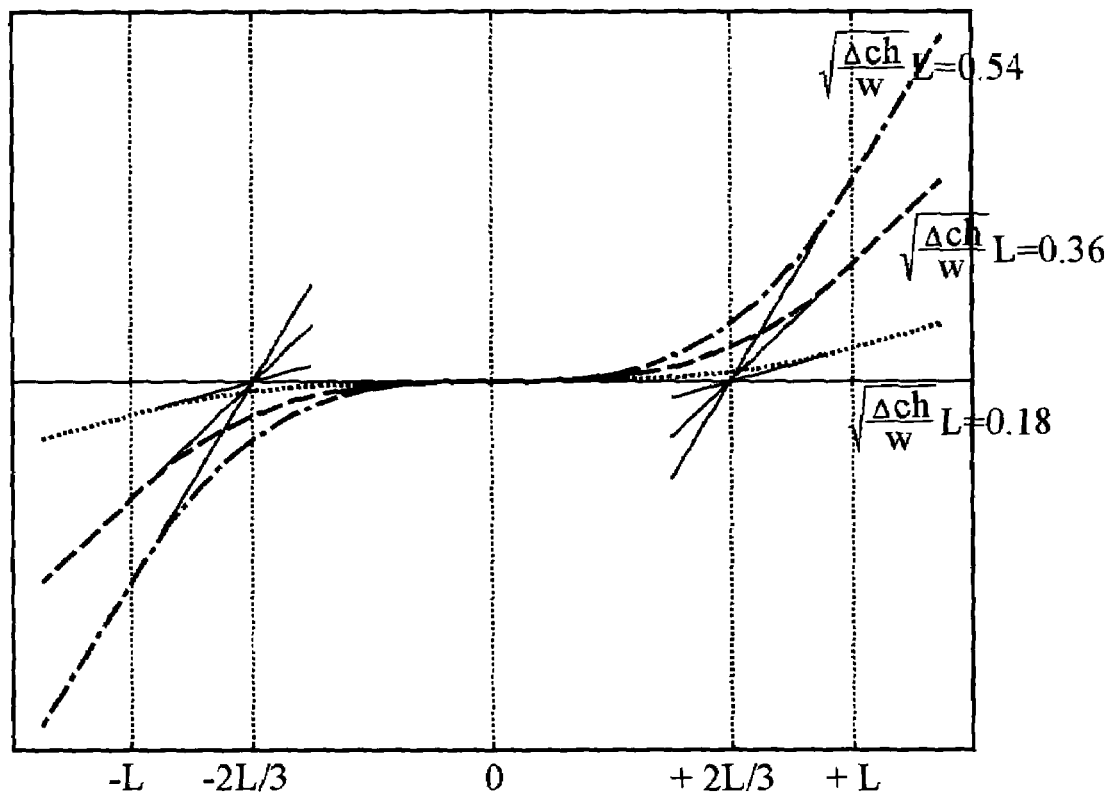
FIG. 2 shows a bending curve of a metal plate for calculating the linear tensile force and contractile force.

If the parameter of Eq.(5) is changed to 0.18, 0.36, 0.54 by the modification of Δch, then the bending curves are varied as shown in FIG. 2. Tangent lines of bending curves, respectively starting from points (+L,y) and (−L,y), of the bent metal plate meet at two points, (2L/3, 0) and (−2L/3, 0). Angles between X axis and each tangent lines may be represented with θ of Eq.(3). By forming the bending curve between the two points (−L, y) and (+L, y) as shown in FIG. 2, it can be seen that the dispersion value of the optical fiber grating can be increased or decreased linearly.

Figure 3:
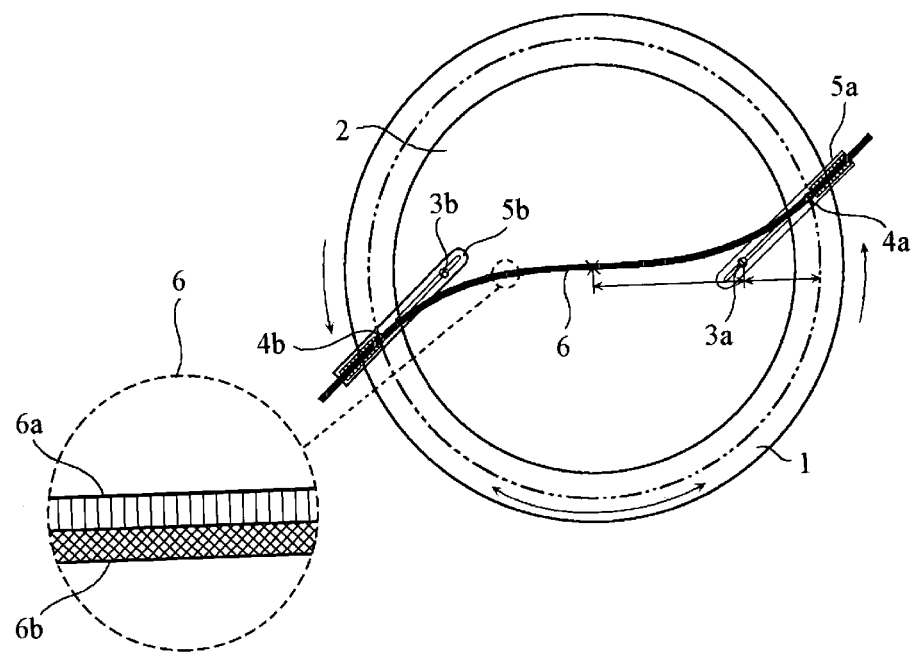
FIG. 3 shows a schematic diagram illustrating a tunable dispersion compensator constructed in accordance with a preferred embodiment of the present invention.

FIG. 3 shows a tunable dispersion compensator 10 based on the optical fiber grating in accordance with an embodiment of the present invention. The tunable dispersion compensator 10 comprises: a ring 1 which is rotating; a disk 2 located at the inner of the outer ring 1 but is not rotating; a metal plate 6b to which an optical fiber grating 6a is attached. The disk 2 is surrounded by the ring 1. The metal plate is fixed to the ring 1. As shown in FIG. 3, the tunable compensator further comprises first and second metal plate holders 5a and 5b for fixing the metal plate 6b to the ring 1. Each of the first and second metal plate holders 5a and 5b includes a rotation axis 4a and 4b and a fixation axis 3a and 3b. The rotation axes 4a and 4b are connected to the ring 1 and moved by the rotation of the ring 1. The fixation axes 3a and 3b are connected to the disk 2 but not moved by the rotation of the ring 1.

The disk 2 is fixed at a position of the inner of the ring 1 using a certain axis (not shown) so that the disk 2 does not move even though the ring 1 rotates. Further, centers of the ring 1 and the disk 2 are identical to the center of the metal plate 6b to which the optical fiber grating 6a is attached.

The both ends of the metal plate 6b are connected to the ring 1 through the rotation axes 4a and 4b of the firs and second metal plate holders 5a and 5b. In general, the metal plate 6b can be fabricated from any materials having high elastic modulus and restoring force. Further, the metal plate can be fabricated from aby metal having a thickness that is below several mm and which is not subjected to lower of performance even in the case of repeated mechanical variations. In the preferred embodiment of the present invention, a spring steel of 15 cm (length)×3 cm (width)×0.2 mm (depth) may be preferably used as the metal plate 6b.

If the length of the metal plate is 2L, then the distances between the center of the metal plate 6b and the rotation axes 4a and 4b 5a and 5b may be L, respectively. The fixation axes 3a and 3b are located at positions apart from the center of the metal plate 6b by distances of 2L/3, respectively. The length of the optical fiber grating 6a, which is attached to the metal plate 6b is shorter than that of the metal plate 6b.

The ring 1 may be rotated clockwise or counterclockwise. By way of illustration, it is shown that the ring 1 rotates in a counterclockwise direction in FIG. 3. If the ring 1 rotates in a counterclockwise direction, then the rotation axes 4a and 4b move along the rotation direction of the outer ring 1, while the fixation axes 3a and 3b do not move. Thus, the metal plate 6b becomes bent, and the periods of the optical fiber grating 6a attached on the metal plate 6b is changed. As a result, the dispersion of the optical signal may be changed by adjusting the reflective path of wavelengths of the optical signals inputted to the optical fiber grating 6a. Even though the periods of the optical fiber grating 6a is illustrated to be constant in FIG. 3, the periods become gradually longer or shorter in the inner of the optical fiber according to predetermined chirping rates.

The tangent lines at both ends of the metal plate 6b meet with the fixation axes 3a and 3b located at positions distanced 2L/3 from the center of the metal plate 6a, respectively. This means that a curve, which is the same with the curve shown in FIG. 2, may be obtained from the bent metal plate 6b and the optical fiber grating 6a. Thus, rotating the ring 1 offers a linear dispersion value to the optical fiber grating 6a located between the center of the metal plate 6b and the both ends of the metal plate 6b. It also compensates the dispersion of the optical signals by finely adjusting the delay time of the wavelengths of the optical signals inputted to the optical fiber grating 6a.

Further, when the ring 1 rotates, the rotation axes 4a and 4b of the first and second metal plate holders 5a and 5b move with a same angle to the center of the outer ring 1. Therefore, there may be induced the tensile force and contractile force which are symmetrical to each other with respect to the center of the optical fiber grating 6a. Consequently, a shift of a central wavelength of the optical signals inputted to the optical fiber grating 6a can be suppressed. This is because the tensile force and contractile force are compensated at the center of the optical fiber grating 6a.

In the preferred embodiment of the present invention, even if one optical fiber grating is attached to the metal plate, it should be noted that a plurality of optical fiber gratings can be attached to the metal plate and used to implement the present invention.

Figure 4:
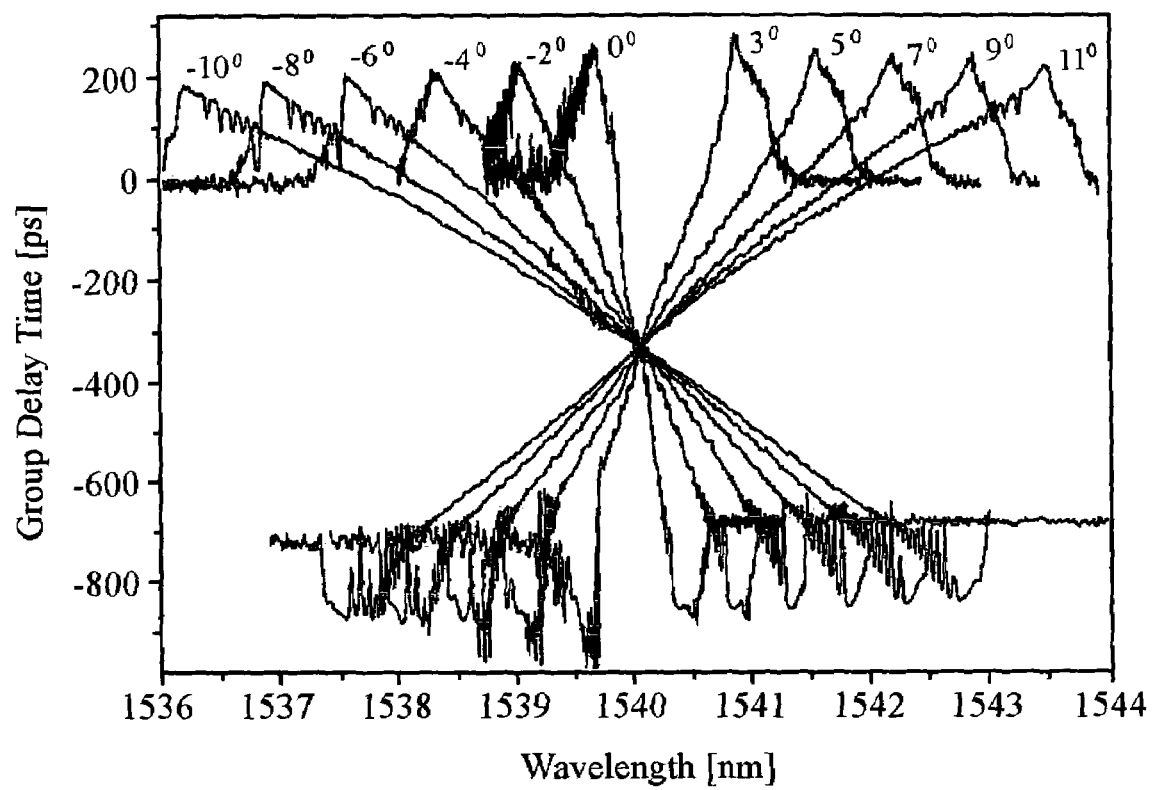
FIG. 4 shows spectra of dispersion slope of the optical fiber grating which are obtained with the tunable dispersion compensator shown in FIG. 3.

FIG. 4 shows spectra of the dispersion value of the optical fiber grating which is measured by Optical Network Analyzer, Q7750 OPTSCOPE, provided by ADVENTEST company, while rotating the ring of the tunable dispersion compensator at an angle ranging from −10° to +11°. As can be seen from the measured results, the dispersion value of the optical fiber grating can be controlled within the expanded range from −141.6 to +148.1 [ps/nm] by using the tunable dispersion compensator of the present invention.

As a result, the delay time of the optical signals inputted to the optical fiber grating can be precisely controlled by controlling the tensile force and the contractile force which are induced to the optical fiber grating based on the rotation of the ring. Also, the dispersion of the optical signal pulses can be readily compensated and the shift of the central wavelength can be suppressed by the symmetrical bending. Furthermore, the dispersion value can be easily controlled only by rotating the ring of the tunable dispersion compensator, and the range of continuously controlling the dispersion value of the optical fiber grating can be expanded.

While the present invention has been shown and described with respect to particular embodiments, it will be apparent to those skilled in the art that many changes and modifications may be made without departing from the spirit and scope of the invention as defined in the appended claims.

What is claimed is:

1. A tunable dispersion compensator comprising:
 a disk;
 a ring surrounding the disk, wherein the ring is rotatable independent of the disk;
 a bendable plate crossing the disk and having end parts configured to move with the rotation of the ring, wherein at least one optical fiber grating is attached to the plate; and
 a first holder and a second holder for fixing the plate to the ring, wherein each of the first and the second holders includes a rotation axis connected to the ring and a fixation axis connected to the disk.

2. The tunable dispersion compensator of claim 1, wherein centers of the disk, the ring and the plate are located at an identical position.

3. The tunable dispersion compensator of claim 1, wherein the rotation axis of each of the first and second holders is located on the ring and rotates according to the rotation direction of the ring.

4. The tunable dispersion compensator of claim 3, wherein the fixation axis of each of the first and second holders is located on the disk and is fixed when the ring rotates.

5. The tunable dispersion compensator of claim 3, wherein two points of the plate are fixed to the rotation axis of each of the first and second holders and the plate is bent according to the rotation of the ring.

6. The tunable dispersion compensator of claim 3, wherein the rotation axis of each of the first and second holders is moved with a same angle to the center of the ring.

7. The tunable dispersion compensator of claim 2, wherein the plate is bent to a symmetrical bending curve with respect to the center according to the rotation of the ring.

8. The tunable dispersion compensator of claim 1, wherein the plate is fabricated from metal.

9. A tunable dispersion compensator, comprising:
 a first plate;
 a second plate adjacent to the first plate, wherein the second plate is movable independent of the first plate;
 a bendable third plate crossing the first plate and having end parts configured to move with the movement of the second plate, wherein at least one optical fiber grating is attached to the third plate; and
 a first holder and a second holder for fixing the third plate to the second plate, wherein each of the first and second holders includes a rotation axis connected to the second plate and a fixation axis connected to the first plate.

* * * * *